Figures 1, 2:
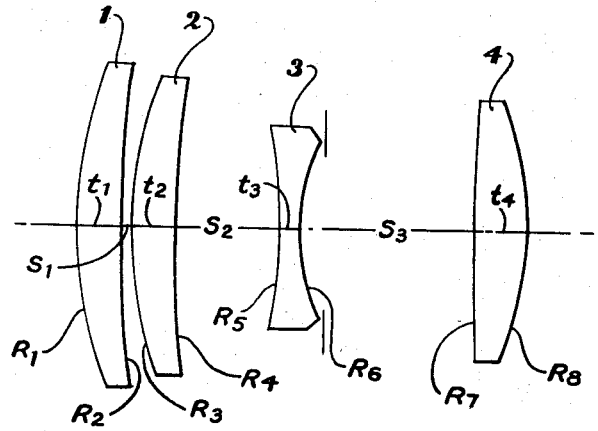

Oct. 23, 1956

F. E. ALTMAN 2,767,614

OPTICAL OBJECTIVE COMPRISING FOUR
AIR-SPACED LENS ELEMENTS

Filed March 31, 1955

| EF = 100 mm. | | | | f/2.8 |
|---|---|---|---|---|
| Lens | N | V | Radii | Thicknesses |
| 1 | 1.6110 | 58.8 | $R_1 = +54.56$ mm. | $t_1 = 4.3$ mm. |
| | | | $R_2 = +302.9$ | $S_1 = 1.2$ |
| 2 | 1.6110 | 58.8 | $R_3 = +54.56$ | $t_2 = 4.3$ |
| | | | $R_4 = +302.9$ | $S_2 = 13.1$ |
| 3 | 1.6890 | 30.9 | $R_5 = -89.24$ | $t_3 = 2.3$ |
| | | | $R_6 = +29.61$ | $S_3 = 22.3$ |
| 4 | 1.6110 | 58.8 | $R_7 = +252.8$ | $t_4 = 5.5$ |
| | | | $R_8 = -40.90$ | |

Fred E. Altman
INVENTOR.

BY Daniel I. Mayne
Harold F. Bennett
ATTORNEY & AGENT

United States Patent Office 2,767,614
Patented Oct. 23, 1956

2,767,614

OPTICAL OBJECTIVE COMPRISING FOUR AIR-SPACED LENS ELEMENTS

Fred E. Altman, Rochester, N. Y., assignor to Eastman Kodak Company, Rochester, N. Y., a corporation of New Jersey Application March 31, 1955, Serial No. 498,131

3 Claims. (Cl. 88—57)

This invention relates to optical objectives for photographic and like purposes, and particularly to the type of objective which consists of the following four airspaced lens elements listed from front to rear: two positive meniscus elements convex to the front, a biconcave element and a biconvex element, all mounted coaxially in a lens barrel or the like.

The object of the invention is to provide an objective of the above type which is inexpensive to manufacture and which gives a high quality image at apertures of about $f/2.8$ and covering a field of about $\pm 10°$.

One of the known improvements upon the so-called Cooke triplet photographic objective was made by dividing the front positive element into two positive elements of roughly equal focal lengths so that the marginal rays are less violently bent at each lens surface and hence have less spherical aberration, when they reach the negative element. Accordingly, the negative element is required to correct the aberration less strongly and contributes correspondingly less zonal spherical aberration to the final image. This improvement is particularly important in lenses covering a moderate angular field of view but requiring a larger relative aperture, such as projection lenses. It is also known to make the two lenses which replace the front positive lens of the Cooke triplet identical in order to reduce the tooling-up cost. This also reduces the number of rejections for edge-chips as a chipped front lens can often be edged down smaller and used as the second element.

In this specification and the appended claims, the front of the objective is considered as that facing the longer conjugate distance in accordance with the usual convention.

According to the present invention, a comparatively inexpensive and highly corrected objective is made up comprising four simple lens elements separated by airspaces of which the third element from the front is negative, has an axial thickness between 0.01F and 0.05F and a refractive index between 1.66 and 1.72 and the other three elements are positive and have axial thicknesses between 0.02F and 0.09F and refractive indices between 1.58 and 1.64, where F is the focal length of the objective as a whole, and in which the several radii of curvature R and airspace s each numbered by subscripts from front to rear are within the following limits $$0.5F < +R_1 < 0.6F$$
$$2F < +R_2 < 6F$$
$$0.5F < +R_3 < 0.6F$$
$$2F < +R_4 < 6F$$
$$0.75F < -R_5 < F$$
$$0.28F < +R_6 < 0.31F$$
$$1.5F < +R_7 < 4F$$
$$0.38F < -R_8 < 0.45F$$
$$0.00 < s_1 < 0.03F$$
$$0.10F < s_2 < 0.16F$$
$$0.18F < s_3 < 0.26F$$

where the + and − values of the radii denote surfaces respectively convex and concave to the front.

Preferably the front two elements are identical with respect to radii of curvature and refractive index.

In the accompanying drawing:

Fig. 1 shows an objective according to the invention, and

Fig. 2 gives construction data for one specific embodiment thereof.

The objective shown in Fig. 1 consists of four lens elements 1, 2, 3, 4 which are coaxially mounted in any suitable mounting (not shown) and of which the third element 3 counting from the front is negative and the others are positive.

Fig. 2 is a table of data for one specific example according to Fig. 1. This table is as follows:

Example 1

EF = 100 mm.   $f/2.8$

| Lens | N | V | Radii, mm. | Thicknesses, mm. |
|---|---|---|---|---|
| 1 | 1.6110 | 58.8 | $R_1 = +54.56$ | $t_1 = 4.3$ |
|   |   |   | $R_2 = +302.9$ | $s_1 = 1.2$ |
| 2 | 1.6110 | 58.8 | $R_3 = +54.56$ | $t_2 = 4.3$ |
|   |   |   | $R_4 = +302.9$ | $s_2 = 13.1$ |
| 3 | 1.6890 | 30.9 | $R_5 = -89.24$ | $t_3 = 2.3$ |
|   |   |   | $R_6 = +29.61$ | $s_3 = 22.3$ |
| 4 | 1.6110 | 58.8 | $R_7 = +252.8$ | $t_4 = 5.5$ |
|   |   |   | $R_8 = -40.90$ |   |

In this table, as in Fig. 2 and in the following table, the lens elements are numbered from front to rear in the first column, the corresponding refractive indices N for the D line of the spectrum and the dispersive index V are given in the second and third columns, and in the last two columns the radii R, thickness $t$ and airspaces $s$, each numbered by subscripts from front to rear, are given in millimeters for a focal length of 100 mm. The back focal length is about 70 mm. and the length of the lens system itself is 53 mm. The diameters of the front two elements may be equal or the second one may be slightly smaller as shown, whichever is found more economical in manufacture.

A second example, which was designed for use in a 75 mm. focal length and to cover a field of $\pm 7°$, differs only slightly and is as follows:

Example 2

EF = 100 mm.   $f/2.8$

| Lens | N | V | Radii, mm. | Thicknesses, mm. |
|---|---|---|---|---|
| 1 | 1.611 | 58.8 | $R_1 = +54.83$ | $t_1 = 0.06$ |
|   |   |   | $R_2 = +324.5$ | $s_1 = 0.01$ |
| 2 | 1.611 | 58.8 | $R_3 = +54.83$ | $t_2 = 0.06$ |
|   |   |   | $R_4 = +324.5$ | $s_2 = 0.13$ |
| 3 | 1.687 | 30.9 | $R_5 = -89.38$ | $t_3 = 0.03$ |
|   |   |   | $R_6 = +29.31$ | $s_3 = 0.22$ |
| 4 | 1.611 | 58.8 | $R_7 = +199.01$ | $t_4 = 0.07$ |
|   |   |   | $R_8 = -42.48$ |   |

It is directly evident from these tables that both the examples embody all the features of the invention in that the radii R, thicknesses $t$, spaces $s$ and refractive indices N are within the specified ranges, and it is by these features that a highly corrected $f/2.8$ objective is produced. It will be noted also that the lens elements are made of ordinary glass types which are readily available commercially and which are less expensive than the high index glasses used in the best Cooke triplets and that the first two elements 1 and 2 are identical with respect to radii of curvature and refractive indices, and it is by these features that the cost of the objective is kept low, lower in fact than some Cooke triplets having only three elements instead of four, and at the same time the oblique spherical aberration and the spherochromatism are almost perfectly corrected.

I claim:

1. A photographic objective comprising four simple lens elements separated by airspaces of which the third from the front is negative, has an axial thickness between 0.01F and 0.05F and a refractive index between 1.66 and 1.72 and the other three are positive and have axial thicknesses between 0.02F and 0.09F and refractive indices between 1.58 and 1.64, where F is the focal length of the objective as a whole, and in which the several radii of curvature R and airspaces $s$ each numbered by subscripts from front to rear are within the following limits:

$$0.5F < +R_1 < 0.6F$$
$$2F < +R_2 < 6F$$
$$0.5F < +R_3 < 0.6F$$
$$2F < +R_4 < 6F$$
$$0.75F < -R_5 < F$$
$$0.28F < +R_6 < 0.31F$$
$$1.5F < +R_7 < 4F$$
$$0.38F < -R_8 < 0.45F$$
$$0.00 < s_1 < 0.03F$$
$$0.10F < s_2 < 0.16F$$
$$0.18F < s_3 < 0.26F$$

where the + and − values of the radii denote surfaces respectively convex and concave to the front.

2. An objective according to claim 1 in which $R_3 = R_1$, $R_4 = R_2$ and the indices of refraction of the first and second elements are equal.

3. An optical objective comprising four airspaced lens elements substantially according to the specification set forth in the following table:

| Lens | N | V | Radii | Thicknesses |
|---|---|---|---|---|
| 1 | 1.611 | 59 | $R_1 = +0.55F$ | $t_1 = 0.04F$ |
|   |       |    | $R_2 = +3.0 F$ | $s_1 = 0.01F$ |
| 2 | 1.611 | 59 | $R_3 = +0.55F$ | $t_2 = 0.04F$ |
|   |       |    | $R_4 = +3.0 F$ | $s_2 = 0.13F$ |
| 3 | 1.689 | 31 | $R_5 = -0.9 F$ | $t_3 = 0.02F$ |
|   |       |    | $R_6 = +0.30F$ | $s_3 = 0.22F$ |
| 4 | 1.611 | 59 | $R_7 = +2.5 F$ | $t_4 = 0.06F$ |
|   |       |    | $R_8 = -0.41F$ |               | where the lens elements are numbered in order from front to rear in the first column, the corresponding refractive indices N for the D line of the spectrum and the dispersive indices V are given in the next two columns, and the radii of curvature R of the lens surfaces, the thickness $t$ of the lens elements, and the airspaces $s$ between the lens elements, each numbered by subscripts, are given in the last two columns, the + and − signs in the fourth column denoting surfaces respectively convex and concave to the front, and where F is the focal length of the objective.

References Cited in the file of this patent
UNITED STATES PATENTS

| | | |
|---|---|---|
| 568,052 | Taylor | Sept. 22, 1896 |
| 660,747 | Bausch | Oct. 30, 1900 |
| 1,540,752 | Bielicke | June 9, 1925 |
| 1,739,512 | Lee | Dec. 17, 1929 |
| 1,825,828 | Sonnefeld | Oct. 6, 1931 |
| 1,877,355 | Minor | Sept. 13, 1932 |
| 2,452,909 | Cox | Nov. 2, 1948 |